Aug. 3, 1937.   J. E. MILLETT   2,089,097
FISHING TILT
Filed Sept. 5, 1934   2 Sheets-Sheet 2
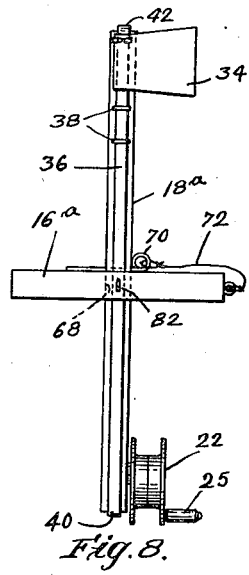
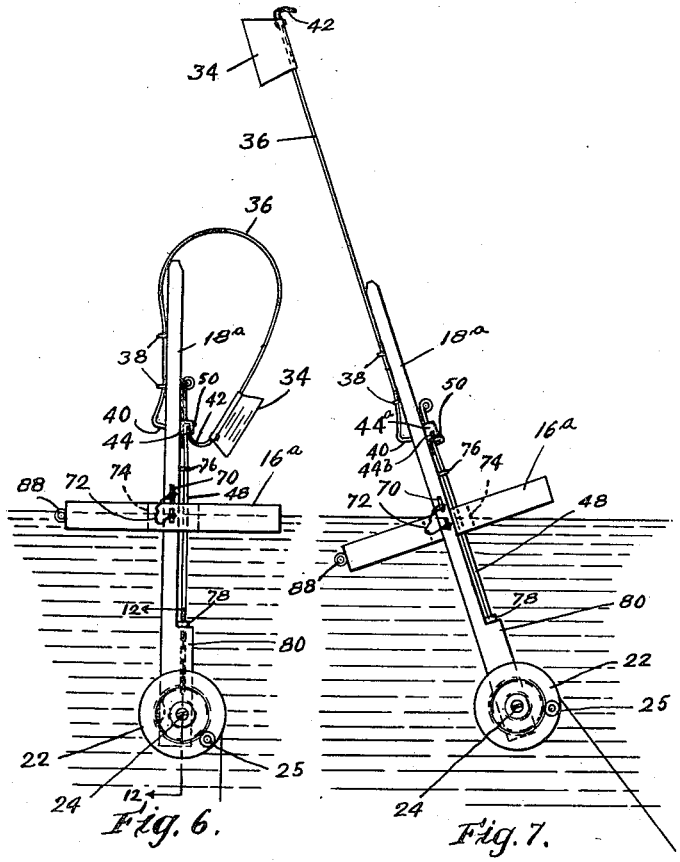
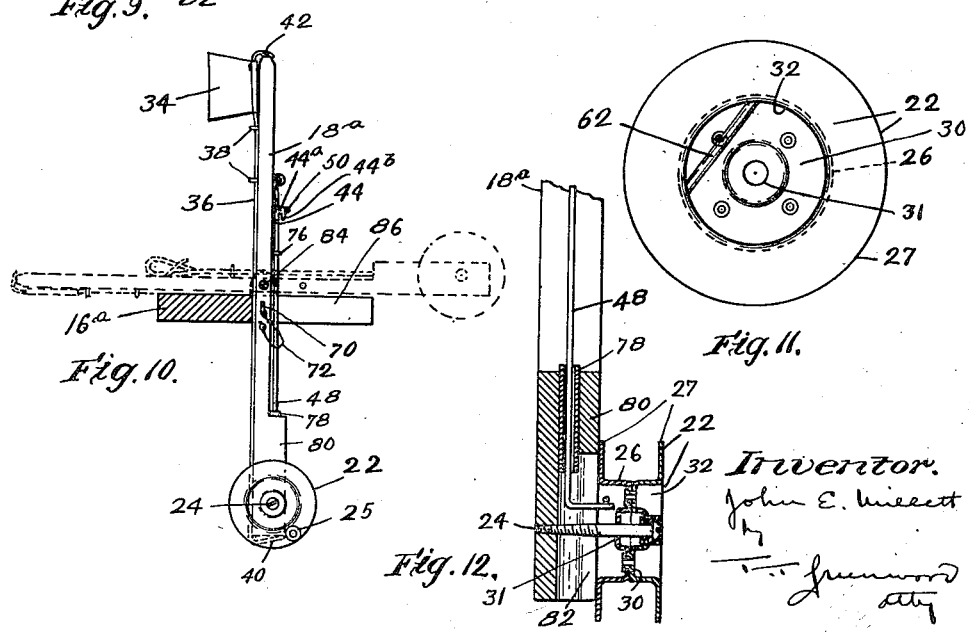

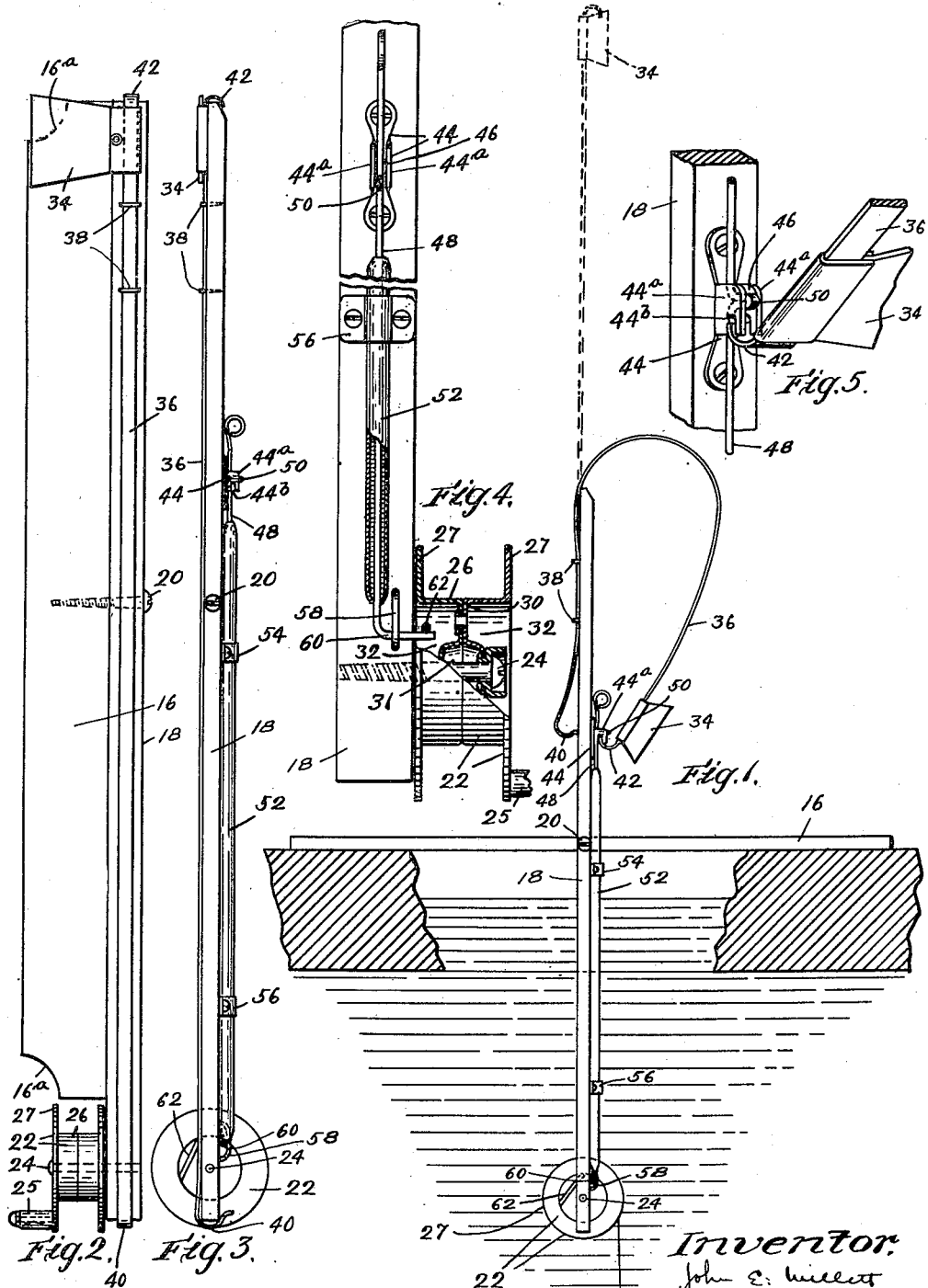
Aug. 3, 1937.     J. E. MILLETT     2,089,097
FISHING TILT
Filed Sept. 5, 1934     2 Sheets-Sheet 1

Patented Aug. 3, 1937

2,089,097

UNITED STATES PATENT OFFICE 2,089,097

FISHING TILT

John E. Millett, Gilman, Vt.

Application September 5, 1934, Serial No. 742,733

19 Claims. (Cl. 43—16)

This invention relates to fishing devices and has particular reference to line holding signal devices adapted to expose a signal flag or the like to indicate the hooking of a fish. A common designation for such a device is a tilt or tip-up.

A fishing tilt is used in winter when fishing through holes cut in the ice and my invention is primarly concerned with tilts intended for ice fishing, although I have also provided a modification of my invention adapted for open water fishing.

The fishing tilt with which this invention is concerned comprises a pair of pivotally connected sticks, one of which constitutes a supporting member and is adapted to lie horizontally across the hole in the ice and the other of which is adapted to be vertically disposed in the hole and has a reel for the line at its lower end, supported under the surface of the water so that the line will not freeze. A signal device as a flag is associated with the sticks and is adapted to be released for movement into an elevated signal display position by the rotary motion of the reel caused by the running out of the line when a fish takes the bait on the hook.

An ice fisherman usually tends to a considerable number of tilts and often has to transport them a long distance from his home to the fishing place. Hence an object of the present invention is the provision of an improved form of fishing tilt that can be collapsed or folded into a compact package so that a number of collapsed tilts will make but a small bundle free from projections and occupy little space.

A further object of the invention consists in a collapsible tilt which, when collapsed, is free from projecting parts that are apt to catch upon parts of another tilt in a bundle thereof or interfere with the compact storage of the tilts.

A yet further object of the invention is the disposition of the reel so that when the tilt is folded the reel is disposed in line with and at one end of the supporting member of the tilt, the widths of the reel and of said supporting member being approximately the same so that the all over width of the collapsed tilt is not materially greater than the width of the two sticks of the tilt.

The tilt of the present invention has the signal flag carried on the end of a flat spring which, in the collapsed condition of the tilt, lies upon the vertical member of the tilt and, when the tilt is in use, projects beyond the upper end of the vertical member and has its projecting end reflexed into an inverted U-form with the flag end engaged releasably with a latch of the vertical member, said end being adapted to be pushed off the latch by mechanism operated by the reel to spring into a vertical signal displaying position.

One of the objects of the present invention is to provide a flag springing mechanism so associated with the reel that there are no projecting parts under the water that are liable to be caught by the line or by weeds and rendered inoperative or caused to be operated accidentally.

In particular an object of the invention is to locate the mechanism that cooperates with the reel mainly within the body of the reel so that there are no projecting parts that are liable to become fouled.

A further object of the invention is the provision of an operating rod extended between the latch and the reel and arranged to be moved longitudinally by rotation of the reel to effect the springing of the flag.

A yet further object of the invention is the provision of flag springing mechanism that is responsive to rotation of the reel in opposite directions so that no particular attention has to be paid to the direction of winding the line on the reel.

A further object of the invention is a modification of the tilt wherein the supporting member of the tilt constitutes a float to support the vertical member in elevated position on the surface of the water.

A yet further object is generally to improve the construction of tilts.

Fig. 1 is a side elevation of the tilt embodying my invention disposed in operative position for ice fishing.

Fig. 2 is a plan view of the tilt of Fig. 1 in collapsed or folded condition.

Fig. 3 is a side view of the tilt of Fig. 2.

Fig. 4 is an enlarged side view detail with part of the reel and tube broken away.

Fig. 5 is a perspective detail of the latch.

Fig. 6 is a view similar to Fig. 1 but illustrating the modification of my invention adapted for open water fishing.

Fig. 7 is a view similar to Fig. 6 but with the flag in elevated position and illustrating the manner in which the supporting float acts as a brake to retard the movement of the fish.

Fig. 8 is an elevation of the device of Fig. 6.

Fig. 9 is a plan view of the device of Fig. 8.

Fig. 10 is a side elevation of a form of the device modified somewhat over the construction of Fig. 6 and adapted for the folding together of its parts.

Fig. 11 is a view of the cam end of the reel of all modifications.

Fig. 12 is a sectional detail taken along line 12—12 of Fig. 6.

The fishing tilt illustrated in Figs. 1 through 5 comprises a horizontal supporting member or stick 16 and a vertical member or stick 18 both preferably being made of wood having about the same thickness and the member 16 preferably being broader than the member 18. The member 16 is at least sufficiently broad to provide a good support for the tilt. The member 18 is pivotally secured to a side face of the member 16 by suitable means as the screw 20 which is fixed in the transverse middle of the member 16 and preferably connects the two members sufficiently tightly together so that there is a substantial amount of frictional resistance to the pivotal movement of the two members. The member 18 at one end projects beyond the corresponding end of the member 16 and at that end carries a reel 22 that is rotatably mounted on a screw or the equivalent 24 fixed in and projecting from that side of the member 18 that confronts the end of the member 16. When the two members are folded into parallel relation the reel 22 is thus disposed in line with and at the end of the member 16. The width of the reel with its handle 25 preferably is not materially greater than the width of the member 16 so that the reel does not project harmfully beyond the sides of the supporting member and hence a number of tilts may be stored readily in a compact collection. The outer corners of the member 16 may be cut away as at 16a to provide clearance for the fingers when rotating the reel.

The reel is provided with a barrel 26 having outstanding end flanges 27 between which the line is wound, the reel being formed of two complemental parts secured together at their central webs 30 which are shaped to provide suitable bearing hubs 31 on the screw 24 and cylindrical recesses 32 extended inwardly from the opposite faces. The type of reel is not of particular importance except that one having a cylindrical recess 32 is preferred.

The signal device of the tilt comprises a flag 34 which is secured to the upper end of a flat spring strip 36, which strip is free for movement in a longitudinal direction under staples or other securing means 38 carried by the vertical member 18. The spring strip 36 is approximately as long as said member 18 and has a reflexed resilient lower end 40 that in the collapsed condition of the tilt underlies and removably resiliently engages the reel end of the member 18 and thus holds the body of the strip against the surface of the member 18. For use the reflexed end 40 is withdrawn from engagement with the end of the member 18 and the spring strip is moved longitudinally outward into a position as illustrated in the dotted lines Fig. 1, which is as far as the reflexed end 40 will permit. The top end of the strip is provided with a hook 42 which is adapted to engage a downwardly inclined latch 44 carried by the member 18 when the strip is bent over into an inverted U-shaped spring-stressed position, as illustrated in the full lines of Fig. 1. The latch 44 can be of any convenient construction and as here illustrated comprises a stamping having a pair of spaced upstanding ears 44a providing a vertical slot or groove 46 between them in which a trip rod, hereinafter to be described, is guided and held from rotary movement. The ears have aligned slots 44b preferably, although not necessarily, parallel with the stick 18, and in which the hook 42 of the spring strip is releasably retained.

In the set position of the signal the spring strip 36 is under tension and when pushed off the latch will spring into an upright position, as indicated by the dotted lines, and thereby display its signal flag 34. The mechanism for causing the disengagement of the spring strip from the latch 44 comprises a trip rod 48 carried by and extended lengthwise of the vertical member 18. Said rod terminates at its upper end in a reflexed forwardly-extending projection or cam 50 which is disposed between the hook 42 of the spring strip 36 and the body of the member 18 which is in and guided for longitudinal movement by the slot 46 of the latch 44. A downward movement of the rod 48 causes the cam 50 to push the hook 42 out of the slots 44b in the latch 44 by movement lengthwise of the strip and against the tension thereof and thus causes the spring strip to spring into an upright position due to its inherent resiliency.

The resistance to hook and latch disengagement is obtained by adjusting the length that the spring strip projects beyond the top of the vertical member 18, the latch disengaging pull of the trip rod 48 being less for a long and greater for a short projecting length of the spring strip. Thus the amount of pull on the line that is required to trip the signal device can be varied within a considerable range, to suit the individual user.

The trip rod 48 is longitudinally movable within a tube 52 which at its upper and lower end portions is clamped to the face of the vertical stick 18 by cleats 54 and 56 secured to said vertical member 18. The tube 52 extends both above and below the water line and the lower end thereof is terminated at the side of the reel. The tube 52 is adapted to be filled with grease so as to prevent the entrance of water within the tube which would be liable to freeze and hold the rod 48 from operation. The ends of the tube are reduced in diameter to about that of the trip rod so as to guide said rod in its longitudinal movement without undue lateral movement thereof. The reduced ends also retain the grease in the tube. The tube also protects the rod from damage. The lower end of the rod 48 projects below the lower end of the tube and has an end portion 60 reflexed at right angles to the body of the rod and slidable under a guide, as a staple, 58 that holds said end portion against swinging movement, the end portion being terminated in the inner cup 32 of the rod.

The reel is provided with a cam member comprising a straight rod 62, see especially Fig. 11, that traverses the cup 32 near the side thereof and is secured to the reel drum in any suitable manner as by soldering.

When the trip rod 48 is in elevated position the lowermost end 60 thereof is disposed further away from the center of the reel than the high point of the cam 62, that is to say, the middle of the cam rod, although the construction is such that the end 60 preferably does not frictionally bear upon the reel to hinder its free rotation. Hence when the reel is rotated by the pull of a fish on the end of the line the cam engages and rides over the end 60 and forces the rod downward thereby causing the trip cam 50 at the upper end of the trip rod to push the spring member off the latch so that the spring member flies into vertical position and displays its signal. The arrangement of the cam 62 and the reel and end 60 of the trip rod is such that the reel operates practically equally well in opposite directions of rotation to effect the downward movement of the rod and the tripping of the signal. Preferably there is a sufficient amount of resistance to the downward movement of the rod so that the lowermost end 60 of the rod by engagement with the cam 62 will hold the reel from rotating due to the weight of payed out line so that the line can be set for any depth and the reel will hold it at this setting until a fish runs away with the line.

With the arrangement of the operating mechanism herein described the engaging parts between the trip rod and the reel are substantially entirely enclosed so that there is no projecting part that is apt to become fouled and held from operation, or operated improperly.

The modification illustrated in Figs. 6 through 10 is adapted for open surface fishing where the tilt floats freely upon the surface of the water. The construction is in principle the same as has been described in connection with Figs. 1 through 5. In Figs. 6, 7 and 8, the horizontal member 16a is of sufficient dimensions to float the tilt on the surface of the water. The vertical member 18a is here extended through the middle of the float member 16a. The float member has a slot 68 in which the vertical member 18a is movable, although frictionally retained in any set position. A pin 70 is extended loosely through the vertical member and is tied by a flexible cable 72 to the float member so as to prevent the vertical member from dropping out of the slot if the frictional engagement between the members should be sufficient to hold the two in set position. The floating member 16a is also provided with a slot 74 extended at right angles to the slot 68 to allow the passage of the operating rod and its cam 50 and the flag 34.

The reel and the operating mechanism and the signal are or can be the same as has been heretofore described except that this modification of the grease tube 52 is not needed and hence the upper end of the trip rod is guided by a staple 76 and the lower end by a short tube 78, see Fig. 12, that is located in an integral boss 80 of the vertical stick 18. The lateral end 60 of the trip rod is held from swinging movement by operating in a slot 82 of said boss 80. The weight of the reel is adapted to keep the vertical member in vertical position when the tilt is floating on the surface of the water. When a fish attempts to run away with the line the device tilts in the water, as illustrated in Fig. 7, and the float member 16a functions as a brake to check the action and thus not only to keep the tilt from being dragged too far by the fish but also to offer such resistance to movement as to cause the fish to be hooked the more securely.

In the construction illustrated in Fig. 10 the vertical member 18a instead of being disconnectible from the float member 16a it is pivoted thereto at 84 sufficiently above the top surface of the water to permit the vertical member to be swung into parallel relation with the float, as illustrated by the dotted lines, the floating member having a slot 86 extending therein from one end thereof for this purpose.

If desired the float member can be provided with an eyelet 88, see Figs. 6 through 9, or other equivalent means by which a line may be attached to the tilt for anchoring it in position.

The wooden parts of the tilt preferably are impregnated or treated with a suitable waterproofing agent that prevents them from absorbing water.

I claim:

1. A fishing tilt comprising a supporting member, a vertical member having a connection with said supporting member so that the relative position of the two members can be modified, a reel pivoted to the lower end of said vertical member, a signal-carrying spring member carried by said vertical member and having a hook at its upper end, said vertical member having a latch adapted to engage said hook, operating mechanism carried by said vertical member and extended between said reel and latch for effecting disengagement of said latch and hook, and means on said reel for actuating said operating mechanism.

2. A fishing tilt comprising a supporting member, a vertical member having a connection with said supporting member so that the relative position of the two members can be modified, a reel pivoted to the lower end of said vertical member, a signal-carrying spring member carried by said vertical member and having a hook at its upper end, said vertical member having a latch adapted to engage said hook, operating mechanism carried by said vertical member and extended between said reel and latch for effecting disengagement of said latch and hook, said operating mechanism including a longitudinally movable cam associated with said latch for moving said hook off said latch, and means operated by said reel for moving said cam longitudinally.

3. A fishing tilt comprising a supporting member, a vertical member having a connection with said supporting member so that the relative position of the two members can be modified, a reel pivoted to the lower end of said vertical member, a signal-carrying spring member carried by said vertical member and having a hook at its upper end, said vertical member having a latch adapted to engage said hook, operating mechanism carried by said vertical member and extended between said reel and latch for effecting disengagement of said latch and hook, said operating mechanism including a longitudinally movable cam associated with said latch for moving said hook off said latch, and means operated by movements of said reel in any one of opposite directions of rotation for moving said cam longitudinally.

4. A fishing tilt comprising a horizontal supporting stick, a vertical stick disposed against one side face of said horizontal stick and having a pivotal connection therewith, said vertical stick being extended at one end beyond the end of said horizontal stick in the folded condition of the tilt, and a reel carried by said extended end and disposed in line with said horizontal stick and beyond and adjacent said end thereof.

5. A fishing tilt comprising a horizontal supporting stick, a vertical stick disposed against one side face of said horizontal stick and having a pivotal connection therewith, said vertical stick being extended at one end beyond the end of said horizontal stick in the folded condition of the tilt, and a reel carried by said extended end and disposed in line with said horizontal stick and beyond and adjacent said end thereof, the axial length of said reel being not substantially greater than the width of said supporting stick.

6. A fishing tilt comprising a horizontal supporting stick, a vertical stick disposed against one side face of said horizontal stick and having a pivotal connection therewith, said vertical stick being extended at one end beyond the end of said horizontal stick in the folded condition of the tilt, a reel carried by said extended end and disposed in line with said horizontal stick and beyond and adjacent said end thereof, a signal device carried by said vertical stick and comprising a resilient spring strip movable lengthwise of said vertical strip outwardly from one end thereof and having a signal device at its outer end, means for holding said strip in reflexed position to said vertical stick, and reel operated means for releasing said strip.

7. A fishing tilt comprising a horizontal supporting stick, a vertical stick disposed against one side face of said horizontal stick and having a pivotal connection therewith, said vertical stick being extended at one end beyond the end of said horizontal stick in the folded condition of the tilt, a reel carried by said extended end and disposed in line with said horizontal stick and beyond and adjacent said end thereof, a signal device carried by said vertical stick and comprising a resilient spring strip movable lengthwise of said vertical strip outwardly from one end thereof and having a signal device at its outer end, means for holding said strip in reflexed position to said vertical stick, real operated means for releasing said strip, said reel operated means comprising a longitudinally movable trip rod having a strip releasing cam at its upper end, and cam means associated with said reel engageable with the lower end of said trip rod for moving it longitudinally.

8. A fishing tilt comprising a supporting structure, a releasable signal device, hook and latch means for holding said device in an unoperated position, a reel carried by said structure, a trip rod having a cam operable upon lengthwise movements of said rod to effect the disengagement of said hook and latch, and cam means associated with said reel for moving said trip rod longitudinally.

9. A fishing tilt comprising a supporting structure, a releasable signal device carried thereby, hook and latch structure for holding said signal device releasably in an unoperated position, a reel rotatable on said supporting structure below said hook and latch structure, a longitudinally movable trip rod carried by said supporting structure having a cam at its upper end for effecting disengagement of said hook and latch structure upon longitudinal movement of said rod, said rod having a laterally projecting part at its lower end, and cam means carried by said reel movable into engagement with said part for effecting longitudinal movement of said rod.

10. A fishing tilt comprising a supporting member, a reel rotatable on said supporting member, a signal device having a releasable connection with said supporting member, an operating rod longitudinally movably carried by said supporting member, said reel having a cup-shaped recess within its barrel and a cam therein, said rod having a laterally extended part which projects into said recess in position to be engaged and moved longitudinally of the rod by said cam, and a cam at the upper end of said rod for disengaging said signal device.

11. A fishing tilt comprising a supporting member, a longitudinally movable rod carried by said supporting member, said supporting member having a slot in one end and said rod having a laterally extended part in and movable longitudinally of said slot, a reel rotatable on said member overlying said slot, said reel having a cup-shaped recess within its barrel and a cam in said recess, said part of said rod being extended into said recess in position for engagement by said cam, a signal device having a releasable connection with said supporting member, and means at the upper end of said rod for effecting disengagement of said signal member.

12. A fishing tilt comprising a horizontal supporting member, a vertical member carried by said supporting member, said vertical member having a reel at the lower end thereof, a latch at the upper end thereof, a spring-urged signal device having a releasable connection with said latch, and means extended between said reel and latch for effecting the disengagement of said signal device and latch, said supporting and vertical members being movable relatively to each other and said supporting member being located on opposite sides of said vertical member and constituting a float which maintains said vertical member upright on a free water surface.

13. A fishing tilt comprising a support having a part that extends both above and below the water line, a reel carried rotatably by said part below the water line, a fish line carried by said reel, a signal device carried by said part above the water line, latching means for normally holding said signal device in set position, and means including a pull rod carried by said part and located between said latching means and reel and traversing the water line, said pull rod being movable lengthwise by the rotational movement of said reel to release said signal means and latching means.

14. A fishing tilt comprising a supporting member, a vertical member having a pivotal connection with said supporting member and having such length as to extend both above and below the water line, a reel carried by said vertical member below the water line, a fish line carried by said reel, a normally spring-actuated signal device carried by said vertical member above the water line, a grease-filled tube alongside of and attached to said vertical member and traversing the water line, and an operating member loose in said tube and movable in response to a pull on said line to spring said signal device.

15. A fishing tilt as in claim 14, said tube lying upon a face of said vertical member and being composed of metal and having reduced ends that permit the free passage and movement of said operating member but retain the grease therein.

16. A fishing tilt having a line-carrying reel below the water line, a normally set spring-actuated signal device above the water line, a grease filled metal tube traversing the water line and having open ends that are smaller than the interior of the body of the tube to retain the grease in the tube and form guide supports, and an operating member movably enclosed within said tube and extended in both directions through the ends thereof respectively above and below the water line and supported movably in said guide supports, said operating member being responsive to a pull on the line to spring said signal device.

17. A fishing tilt comprising a support, a line-carrying reel on said support, a trippable signal device on said support including a spring strip having a hook and a signal at a free end, a latch carried by said support adapted to be engaged by said hook to hold said signal device in set position, tripping mechanism having a part engageable with said strip and operative to move said hook in a direction lengthwise of said strip and against the tension of said strip out of engagement with said latch, and means for varying the effective length of said spring strip thereby to vary the resistance to latch and hook disengaging movement.

18. A fishing tilt comprising a support, a line-carrying reel on said support, a trippable signal device on said support comprising a spring strip having a free end provided with a hook and a signal, a latch on said support releasably engageable with said support to hold said spring strip stressed and said signal device in condition for tripping, means responsive to a pull on the line for moving said hook off said latch in the direction of the length of said spring strip and against the tension thereof, and means for varying the effective length of said spring strip.

19. A fishing tilt comprising an elongated reel supporting member adapted to be supported with its lower end submerged, a reel rotatable on the lower end of said member and submerged therewith, a releasable signal device carried by the upper end of said supporting member, signal releasing mechanism extended between said reel and signal device, and operating mechanism for effecting the operation of said releasing mechanism to release said signal device in response to rotation of said reel in any one of its two directions of rotation.

JOHN E. MILLETT.